United States Patent Office 3,050,458
Patented Aug. 21, 1962

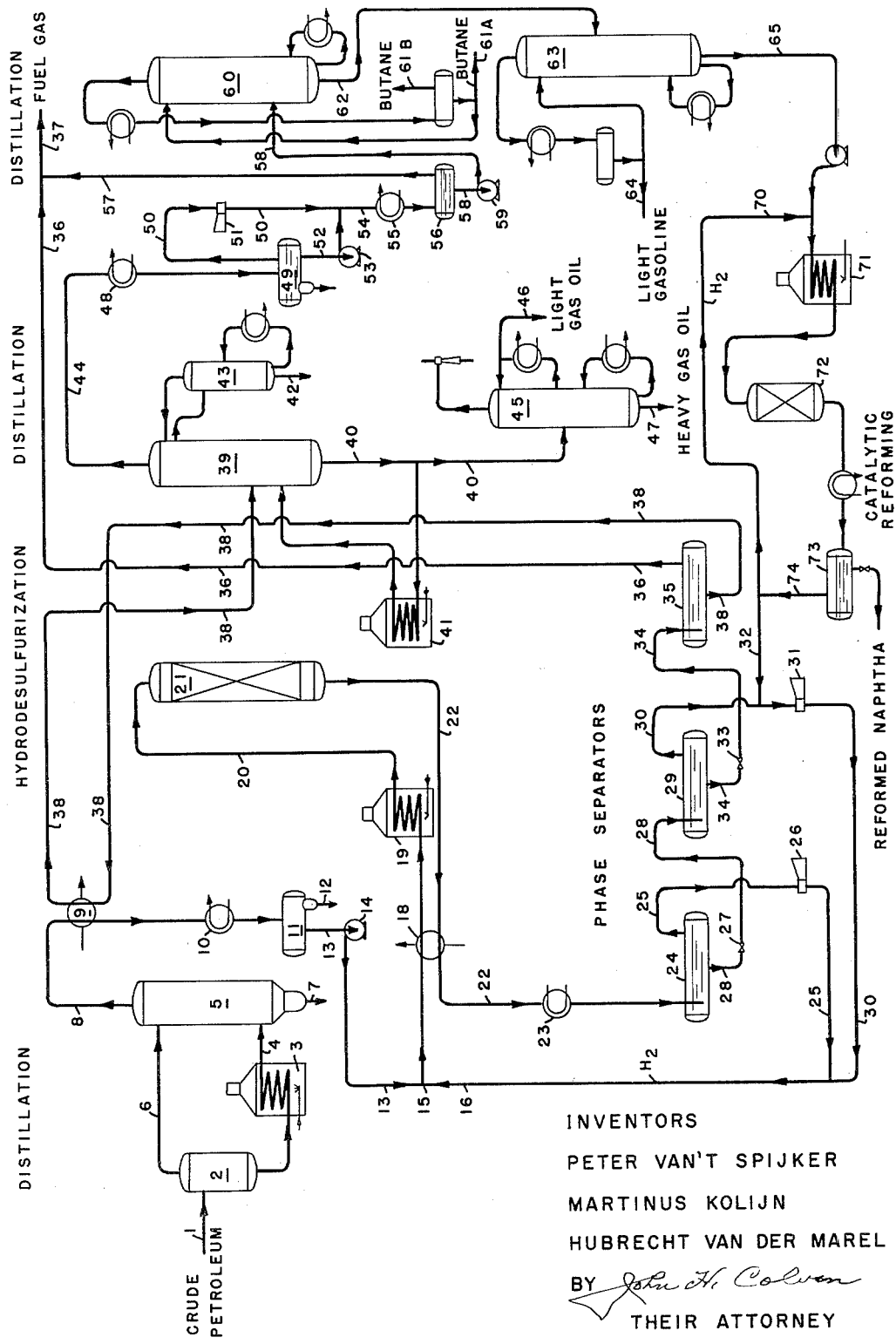

3,050,458
PETROLEUM REFINING PROCESS
Peter van't Spijker, Martinus Kolijn, and Hubrecht van der Marel, all of The Hague, Netherlands, assignors to Shell Oil Company, a corporation of Delaware
Filed Dec. 10, 1958, Ser. No. 779,501
Claims priority, application Netherlands Dec. 13, 1957
6 Claims. (Cl. 208—89)

This invention relates to a process for the refining of petroleum or more exactly, that portion of petroleum boiling up through the kerosene and gas oil range, e.g. up to about 300 or 400° C.

An object of the invention is to provide a process whereby, compared to conventional practice, a large saving in equipment may be realized and adequately desulfurized products may be obtained without recourse to the special separate manufacture of hydrogen. Other objects will be apparent from the further description of the process and its operation.

In the conventional refining process the petroleum is first separated into a number of different fractions such, for example, as a butane fraction, a pentane fraction, straight run gasoline, naphtha, kerosene, light gas oil, etc. In not all cases is each of these fractions first separated but at least some of them are. These fractions are then suitably refined by various known refining methods to produce such products as gasoline, special solvents, paint thinner, kerosene, diesel fuel, agricultural spray oils, etc. In all of these products sulfur is an undesired impurity and is removed, at least in part, by the various refining methods used. The most efficient method for removing sulfur impurities and also largely benefitting the products in other ways is by catalytic hydrodesulfurization. Catalytic hydrodesulfurization can be applied to a wide variety of products as well as to the whole crude petroleum and is well known. In substance, it consists of combining the material to be treated with recycled hydrogen and contacting the mixture under hydrogenation conditions with a sulfactive hydrogenation catalyst of which many are known. In spite of this apparent simplicity hydrodesulfurization plants are costly to build and operate. To build a separate plant for each product to be treated would be uneconomical. Therefore, it is the practice to install only a few plants and to operate them in so called "blocked out" operation. This is also costly and involves large tankage costs.

Another factor in the hydrodesulfurization that should be mentioned before describing the invention is the availability of hydrogen. The economics of hydrodesulfurization are rather favorable when by-product hydrogen is available at fuel gas value but becomes much less favorable if hydrogen has to be manufactured specifically for the hydrodesulfurization operation. Hydrodesulfurization is, therefore, practically limited to those cases where by-product hydrogen is available from a catalytic reforming operation and the degree to which hydrodesulfurization is utilized is usually limited by the availability of such hydrogen. When it is considered that only a quite narrow segment of the boiling point spectrum of petroleum is suitable as a catalytic reforming feed it will be readily seen that the hydrogen available from the catalytic reforming of that small segment amounts to only a few cubic feet per barrel of the total products. Efficient use of the available hydrogen is, therefore, most desirable.

In the present practice the mixture of treated hydrocarbon and excess hydrogen gas issuing from the hydrodesulfurization reactor is cooled at substantially the hydrodesulfurization pressure and passed to a phase separator. Gas rich in hydrogen is withdrawn from the separator and is recycled to the hydrodesulfurization zone by a compressor. Condensed liquid from the separator is expanded to approximately atmospheric pressure and passed to a second phase separator. Such two-stage separations are illustrated, for example, in British Patents Nos. 669,536 and 602,097. The approximately atmospheric pressure in the second phase separator is used because the liquid desulfurized oil withdrawn from the separator contains less hydrogen sulfide as the pressure is lowered. The gas which separates in the second separator comprises hydrogen sulfide and light hydrocarbon vapors and is generally used as fuel gas. In principle, this gas could be compressed, treated to remove hydrogen sulfide and recycled through the desulfurization unit. However, in this case the quantities of hydrogen involved are small while the cost of compressing them to build them up to the hydrodesulfurization reactor pressure is so great that recycling is uneconomical.

The conventional operation just described is quite sufficient when treating a narrow relatively high boiling product such, for example, as the diesel fuel portion of the petroleum but it is not suited for the treatment of wide boiling range materials representing all or nearly all of the crude. Firstly, the higher boiling part of the crude petroluem is found to consume an inordinately large part of the already sparsely available hydrogen. In the second place, it has been found that if a feed stock of this type is processed such large quantities of hydrogen remain dissolved in the liquid separated in the first separator operating at essentially the hydrodesulfurization reactor pressure that the hydrogen losses become inadmissibly high. Consequently, in cases of this type the gas separated in the second or low pressure separator is not used as fuel gas but is recycled after compression. This low pressure separator gas, however, now contains many light hydrocarbons and also hydrogen sulfide and these materials must be at least partly removed from the recycle gas in order to avoid an inadmissible reduction in the partial pressure of hydrogen. This removal is effected by means of a scrubbing treatment usually with part of the desulfurized oil from which light hydrocarbons and hydrogen sulfide have been removed. This process, an example of which is described in British Patent No. 710,342, is complicated and expensive both as regards capital and operating costs.

The process of the present invention affords a substantial improvement over the conventional types of operation. Thus the prefractionation of the petroleum into various fractions and the separate hydrodesulfurization of the fractions either in blocked out operation or in multiple plants is avoided. According to the present process the crude petroleum is first topped to separate as overhead a single broad range fraction including substantially all of the normally liquid hydrocarbons present boiling up to about 300 to 400° C. and containing pentanes, gasoline, naphtha, kerosene and other oils boiling up to said temperature range. The various products such as gasoline, kerosene, diesel fuel, paint thinner, etc. are separated from the single desulfurized product. This has also the additional advantage that the fractionation costs can be reduced. Thus, upon hydrodesulfurization of a specific fraction, the boiling range is usually changed somewhat and the product has to be rerun. This is not the case when operating according to the invention. On the other hand, in the process of the present invention the crude petroleum is not desulfurized but only such part thereof as boils up to the range of from about 300 to 400° C., possibly 450° C., in some cases where the amount of naphtha suitable for catalytic reforming is large and contains over 50% by weight naphthenes. This not only allows the process to be self-sufficient with respect to catalytic reformer hydrogen but also allows the available hydrogen to be more efficiently utilized and makes oil scrubbing of the recycle gas unnecessary.

The invention does not lie in the catalytic hydrodesulfurization of the specified fraction of petroleum as contrasted to narrow boiling fractions but in the catalytic hydrodesulfurization of the specified broad range fraction in combination with the specific method of handling the gas as the specified pressures as will now be described.

In the process of the invention the hydrodesulfurization is effected at a pressure between about 30 and 65 kg./cm.$^2$ and the product issuing from the hydrodesulfurization reactor is cooled to a temperature of about 40° C. or below and passed to a first phase separator which (except for the pressure drops through the lines and cooler) is at substantially the hydrodesulfurization pressure. Gas rich in hydrogen is withdrawn from the separator and recycled to the hydrodesulfurization zone by a first compressor. Liquid condensate is withdrawn from the first separator and passed through an expansion valve to a second phase separator which is maintained at a pressure between about 15 and 30 kg./cm.$^2$ and further adjusted within this range as will be described below. Gas withdrawn from the second phase separator is mixed with hydrogen from the catalytic reforming operation and the mixture is passed to the hydrodesulfurization zone by a second compressor. Liquid withdrawn from the second phase separator is passed through an expansion valve into a third phase separator which is maintained at a pressure between about 3 and 7 kg./cm.$^2$. Gas from the third phase separator is withdrawn and used as fuel. Liquid from the third phase separator is passed to a splitter operating at a pressure between about 1 to 1.5 kg./cm.$^2$ and in which a split is made approximately between kerosene and lower boiling materials and heavier gas oil materials. The desired final products such as naphtha, catalytic reforming feed, diesel fuel, etc. are fractionated from these products. The overhead product is compressed by a third compressor to a pressure approximately equal to that prevailing in the third phase separator and combined with the gases from that separator. The naptha fraction is catalytically reformed under a pressure between about 15 and 30 kg./cm.$^2$ and the pressure in the second phase separator is adjusted such as it is substantially equal to that on the reformed naphtha effluent.

It is to be emphasized that the above described process would be economically unattractive for the hydrodesulfurization of a gas oil, for example, but is highly advantageous when treating the above described specific portion of petroleum which contains many light hydrocarbon components.

The invention will now be described in more detail with reference to specific examples. In this description references will be had to the accompanying drawing which is a flow diagram of a plant designed to operate in accordance with the principles of the invention.

Preheated crude oil is passed through line 1 to the flash vessel 2 where as a result of a reduction in pressure the vapors formed are separated from the unvaporized liquid. After further heating in furnace 3 the liquid is passed through line 4 to the crude oil distillation column 5 which operated at approximately atmospheric pressure. Without further heating the vapors separating in 2 are also passed to column 5 through line 6. In column 5 the crude oil is separated into a bottom product boiling above approximately 350° C. (the long residue) which is removed through line 7, and into a vaporous top product boiling below approximately 350° C. which is removed through line 8 and is cooled and condensed in heat-exchanger 9 and condenser 10.

This broad boiling range fraction which is collected in vessel 11 in the amount of 5352 metric tons per day has the following composition and properties:

| Component: | Kg. mol/hr. |
|---|---|
| $C_2$ | 15.3 |
| $C_3$ | 69.9 |
| $C_4$ | 136.6 |
| $C_5$ | 116.8 |
| $C_6$–100° C. | 297.7 |
| 100–200° C. | 445.0 |
| 200–250° C. | 208 |
| 250–300° C. | 182.4 |
| 300–350° C. | 145.7 |
| Sum | 1,617.5 |
| Average molecular weight | 138 |
| Percent sulfur | 0.65 |

This condensate is passed through the water separator 11 (water discharged through 12) and the oil fraction is passed through line 13 and pump 14 to the point 15 where the oil comes into contact with hydrogen-rich recycle gas supplied through line 16 at a pressure of approximately 69 kg./cm.$^2$. The cold mixture of oil and hydrogen-rich gas (approximately 32° C.) flows through line 17, heat exchanger 18, furnace 19 and line 20 to reactor 21 which contains a fixed bed of a desulfurization catalyst comprising cobalt oxide and molybdenum oxide supported on a carrier mainly consisting of alumina. The average pressure in this reactor is approximately 62 kg./cm.$^2$ and the average temperature 375° C. The oil present in the reactor is only partly evaporated in the heat exchanger 18 and the furnace 19, so that part of the oil to be desulfurized flows downward over the catalyst particles in a liquid state.

The hydrode-sulfurization conditions described in the above are for a specific example. It will be appreciated also that other catalysts may be used. Suitable catalysts for this purpose include catalysts comprising one or more of the elements nickel and cobalt as well as one or more of the elements molybdenum and tungsten, and a carrier wholly or partly consisting of $Al_2O_3$, which elements are present in the metallic state and/or in the form of one or more compounds with each other and/or with one or more other elements such as oxygen and sulfur. Particularly suitable are desulfurization catalyst comprising alumina as a carrier and 5–15% by weight of cobalt and molybdenum in the metallic state and/or in the form of one or more compounds with each other and/or with one or more of the elements oxygen, sulfur and aluminum, the atomic ratio of cobalt to molybdenum being in the range of from 1:20 to 18:20, preferably from 1:10 to 9:10.

Catalysts of this type are, where they were not already obtained in sulfide form during their preparation, wholly or partly sulfided either during a special conditioning period or during the desulfurization process itself. In this state their desulfurizing activity is generally substantially greater than in the non-sulfided state.

The hydrogen, or the hydrogen-containing gas, passes through the catalyst bed either counter-currently or in parallel flow to the unevaporated part of the feedstock. Parallel flow is generally preferred.

The desulfurization temperature is generally in the range of from 300° C. to 500° C., preferably from 325° C. to 400° C. The operating inlet pressure is in the range of from about 35 to 70 kg./cm.$^2$. The hydrogen/oil ratio is such that after cooling the reaction mixture and removal of $H_2S$, at least 50 liters (standard conditions, at 76 cm. Hg and 0° C.) of gas per kg. of feedstock supplied remains, preferably 100–200 liters (standard conditions, at 76 cm. Hg and 0° C.) per kg.

The gas used my be hydrogen or a gas mixture rich in hydrogen. The gas separated from the reaction products is recycled, care being taken to ensure that the hydrogen sulfide content and the content of components other than hydrogen does not become excessive, since otherwise the partial hydrogen pressure would reach too low a value and there would be a reduction in the degree of desulfurization of the feedstock.

Since in the desulfurization there is a certain consumption hydrogen, recycling alone is not sufficient and fresh make-up hydrogen-rich gas must be added. This gas rich in hydrogen is obtained at a by-product in the catalytic reforming treatment of gasolines and naphthas as will be described. The available quantities of this fresh gas are relatively small.

The reaction mixture leaving the hydrodesulfurizer reactor through line 22 first passes the heat exchanger 18 (cooling to approximately 125° C.) and then the cooler 23 (further cooling to approximately 40° C.), after which the partly liquid and partly vaporous reaction mixture is passed to the high pressure separator 24 in which a pressure of 58.5 kg./cm.$^2$ and a temperature of 40° C. prevail and gas is separated from liquid.

Although as a result of the pressure losses in the lines and the cooler(s) the pressure in the high-pressure separation zone is, of course, always a little lower than the pressure in the desulfurization zone, which is in the range of from 35 to 70 kg./cm.$^2$. In the process according to the present invention these pressure losses are not deliberately increased by providing reducing valves, etc., but on the contrary, are preferably kept as small as possible in order to keep down the cost of the compression required to restore to the desulfurization pressure the recycle gas from the high-pressure separation zone. As a result the pressure in the high-pressure separation zone will only be slightly lower than that in the desulfurization zone and generally in the range of from 30 to 65 kg./cm.$^2$. At such high pressure values the recycle gas leaving the separation zone 24 generally contains such a small amount of H$_2$S and other contaminations that it can be recycled without further treatment.

The reaction mixture is preferably cooled before it enters the high-pressure separation zone to relatively low temperatures, for example to approximately 40° C. or lower. In certain cases, however, a less drastic cooling is sufficient. The gases withdrawn from separator 24 by line 25 are discharged as recycle gas through line 25, the pressure being raised from 58.5 kg./cm.$^2$ to over 69 kg./cm.$^2$ by means of compressor 26. Line 25 leads into the recycle gas line 16.

The liquid from the separation zone 24 is passed via one or more lines provided with reducing valves into the separation zone 29 in which further quantities of gases and vapors escape from the liquid as a result of the reduced pressure. Provided the pressure is suitable, these gases and vapors are still so rich in hydrogen and so poor in other components (H$_2$S, light hydrocarbons, etc.) that they can be recycled without further purification. Only in certain special cases, may it be desirable to remove the H$_2$S from this stream of recycle gas. Thus, the liquid collecting in separator 24 is passed through the line 28, provided with reducing valve 27, to the separator 29 in which the pressure is 23 kg./cm.$^2$ and the temperature 40° C. Part of the light components evaporate as a result of the reduction in pressure. The gases liberated are passed to the recycle gas line 16, through line 30, the pressure being raised from 23 kg./cm.$^2$ to over 69 kg./cm.$^2$ by the compressor 31. Before this compressor fresh, make-up hydrogen-rich gas having a pressure of approximately 23 kg./cm.$^2$ is added through line 32. This gas is obtained from the catalytic reforming plant.

It is found that when the pressure in the separation zone 29 is reduced the quantity of gas escaping increases, and at the same time the purity (H$_2$ content) declines. Surprisingly it has now been found that the said pressure range of from 15 to 30 kg./cm.$^2$ is very suitable from this point of view also as large quantities of gas can then be obtained of such a high degree of purity that in most cases removal of contaminations is unnecessary.

The unevaporated liquid flows through the line 34, provided with reducing valve 33, to the separator 35 in which a pressure of 5 kg./cm.$^2$ and a temperature of 40° C. prevail. The gases liberated consist mainly of light hydrocarbons, but also containing relatively large quantities of other components such as hydrogen sulfide and hydrogen. These gases are discharged through lines 36 and 37 to a plant in which the H$_2$S present is removed by means of a diethanolamine solution to give a fuel gas which is substantially free from H$_2$S. The liquid from separator 35 is passed through line 38 to distillation column 39, a certain degree of heating already occurring in heat exchanger 9.

The desulfurized product must be split up into a number of fractions by means of successive distillations. In this case the first distillation should be carried out at a fairly low pressure, viz. at approximately 1 to 1.5 kg./cm.$^2$, as otherwise, owing to the presence of relatively heavy components, the bottom temperature in the first distillation column becomes so high that cracking can occur.

This is an additional reason why the above-mentioned operating pressures are most suitable in the third separation zone as they enable the liquid from the separator to be passed, without the use of pumps, to the first distillation column through the generally fairly long lines and the heat-exchangers and/or furnaces usually present.

The desulfurized oil is separated in distillation column 39 at approximately atmospheric pressure into a gas oil fraction which is discharged as bottom product through line 40 (part of this fraction being recycled via the re-evaporation furnace 41), into a kerosene fraction which is discharged from the side stripper 43 through line 42, and a gasoline gas plus naphtha fraction which is discharged as vaporous top product through line 44.

In the column 45, which operates at a pressure of approximately ½ atm.abs., the gas oil is separated into a light and a heavy gas oil which are removed via lines 46 and 47, respectively.

The top products from the first distillation column, at least when a light fraction of the above type is worked up, cannot be cooled in a conventional manner (for example in condensers cooled with cooling water) to such an extent that they condense completely, even when the pressure is increased. There always remains a quantity of uncondensed material which is rich in C$_1$–C$_4$ hydrocarbons and also contains, inter alia, hydrogen and hydrogen sulfide.

Generally this condensation is carried out in such a way that the top products from the first distillation zone are first cooled at the distillation pressure (1 to 1½ kg./cm.$^2$) to a temperature of approximately 40° C. or lower, the non-condensing gases are compressed to a pressure substantially equal to that in the low-pressure separation zone before the first distillation zone and are then mixed with the components which have condensed and are supplied via a pump, and the mixture is cooled to approximately 40° C. or lower and then passed through a gas and liquid separator. If desired, the liquid is passed to a subsequent distillation column, while the uncondensed gases are preferably mixed with the gases from the low-pressure separation zone and together with these gases are freed from H$_2$S and used as fuel gas. Particularly on account of this mixing it is desirable for the pressure at which the uncondensed gases are obtained to be substantially equal to the pressure in the last separation zone succeeding the desulfurization zone.

In this connection it should be noted that at first sight it seems attractive to omit altogether the last separation zone between the desulfurization zone and the first distillation column, because in principle the gases which would separate in this separator in the present process could be passed through the first distillation column without difficulty, after which they could be separated from the top product together with the non-condensing components obtained in the present process. In this way the low-pressure separator with relevant lines, etc. could be dispensed with.

Surprisingly, however, it has been found that with the use of such an arrangement the quantities of non-condensing gases which can only be used as fuel gas are substantially larger than with the use of the process according to the invention in which this low-pressure separation zone is used, so that the latter process is far preferable. Moreover, the cost of compression is lower in the process according to the invention.

In condenser 48 the gasoline gas fraction is partially condensed and passed to the gas and liquid separator 49. The gases are passed through line 50 and compressor 51, and the liquid through line 52 and pump 53 to line 54 after which the mixture enters via cooler 55 and phase separator 56 where a pressure of approximately 5 kg./cm.$^2$ and a temperature of approximately 40° C. prevail. The uncondensed gases, mainly consisting of light hydrocarbons and H$_2$S, and also containing minor quantities of other components such as hydrogen, are discharged to line 37 through line 57 and are thus purified together with the gases discharged from the low-pressure separator 35 through line 36. The liquid from separator 56 is passed through line 58 and pump 59 to distillation column 60 in which it is separated at a relatively high pressure (10–14 kg./cm.$^2$) into a top product consisting of butane and lower boiling components which is discharged partly in a liquid and partly in a vaporous state through the lines 61A and 61B respectively, and a bottom product consisting of butane-free gasoline plus naphtha. This is passed through line 62 to column 63 where at a pressure of approximately 2 kg./cm.$^2$ it is separated into a light gasoline (discharged through 64) and a naphtha (discharged through 65).

The naphtha fraction boiling, for instance, between 80° C. and 185° C. is mixed with recycle hydrogen gas from line 70 the amount being between about 1 and 10 moles of hydrogen per mole of hydrocarbon. The mixture is preheated to a temperature between 480° C. and 525° C. in heater 71 and passed to the catalytic reforming reactor 72 at a rate corresponding to a liquid hourly space velocity between about 0.5 and 4. The catalyst in this particular instace is 0.7% platinum supported on an alumina carier and promoted withabout 0.5% chlorine and 0.4% fluorine. The inlet pressure to the catalytic reforming zone is about 29 kg./cm.$^2$. The effluent from the catalytic reforming zone is cooled and pasesd to a phase separator 73 which due to pressure drop through the catalyst bed, cooler, connecting lines, etc. is at about 23 kg./cm.$^2$. Gas rich in hydrogen is withdrawn from the phase separator by line 74. Part of this gas is recycled to the catalytic reforming zone by line 70 and the net gas make is passed by line 32 to the gaseous effluent from the phase separator 29 as before mentioned. For simplicity a single catalytic reforming reactor 72 is shown whereas in fact a series of 3 or 4 such reactors operated in series with interstage heating is preferred and this accounts for the 6 kg./cm.$^2$ pressure drop indicated.

While the catalytic reforming is preferably carried out with a platinum catalyst (or palladium or rhodium) as just described it will be understood that other reforming catalysts, although ont equivalent, can be used. Such catalyst normally comprises as the dehydrogenation promoter one or more oxides or sulfides of chromium, molybdenum and/or tungsten.

Thus, in the process shown diagrammatically in the figure the products obtained are an undesulfurized "long residue" which can be used as fuel oil, and also the following desulfurized fractions; butane and lower boiling components, light gasoline, naphtha, kerosene, light bas oil and heavy gas oil. Suitable values of the initial and final boiling points of the liquid fractions are summarized in Table I below:

TABLE I

| | I.B.P. | F.B.P. |
|---|---|---|
| Light gasoline | | between 65 and 93° C. |
| Naphtha | between 65 and 93° C. | between 165 and 185° C. |
| Kerosene | between 165 and 185° C. | approximately 250° C. |
| Light gas oil | approximately 250° C. | approximately 300° C. |
| Heavy gas oil | approximately 300° C. | approximately 350° C. |
| Long residue | approximately 350° C. | |

*Example*

This example relates to the catalytic desulfurization of the whole crude oil fraction boiling up to 350° C. of a crude petroleum. The properties of this fraction are those given above for the example described at length. A quantity of 1617.5 kg. mol/hr. of this fraction is desulfurized over a commercial cobalt oxide molybdenum oxide alumina catalyst with the use of the trickle technique, the average pressure in the reactor being 62 kg./cm.$^2$ and the average temperature in the reactor 375° C. The space velocity was 4.1 oil/l. catalyst hr.

The mixture leaving the reactor was then worked up in three different ways, viz.:

(a) according to the present invention (=case 1);
(b) with the use of two separators before distillation column 39, viz. a high-pressure separator and an intermediate-pressure separator (=case 2);
(c) with the use of two separators before distillation column 39, viz. a high-pressure separator and a low-pressure separator (=case 3).

(a) In case 1 the reaction product was desulfurized and worked up according to the process shown in the drawing, the temperatures, pressures, etc. being those mentioned in the description of this process.

The temperatures prevailing in the separators were in every case 40° C.

The absolute quantities and the compositions of the various streams are summarized in the companion Tables 2A and 2B under "case 1."

(b) In case 2 the desulfurization was effected under the same conditions as in case 1. In the working-up of the reaction product, however, the separator 35 was omitted, which means that the lines 34 and 38 were short-circuited and the vapor line 36 omitted. Consequently, after cooling and expansion without intermediate separation of light components the gas from the separator 29 found its way into column 39. These components were therefore discharged through line 57 only, instead of through lines 36 and 37. Otherwise the plant and conditions were the same as in case 1.

The absolute quantities and the compositions of the various streams are summarized in the Tables 2A and 2B under the heading "case 2."

(c) In case 3 the desulfurization was again effected under the same conditions as in cases 1 and 2. This time the separator 29 was omitted in the working-up of the reaction product so that the liquid from the separator 24 was passed directly to the separator 35. Hence, the lines 28 and 34 were short-circuited and line 30 omitted. Otherwise the plant and operating conditions were the same as in case 1.

The absolute quantities and the compositions of the relevant streams are summarized in Table 2A under the heading "case 3."

In the first place the Tables 2A and 2B show that with the liquid from the high-pressure separator approximately 76–78 kg. mol./hr. of hydrogen were discharged in a dissolved state. In the proces formerly employed (case 3) this hydrogen found its way into the fuel gas through lines 36 and 57 and was therefore lost to the desulfurization process. In the process according to the invention (case 1), however, approximately 54 kg. mol/hr. of hydrogen are recovered in a gaseous state which means that it is possible to reduce the hydrogen losses by no less than approximately 70%. Moreover, the gas mixture has such a high hydrogen content that it can be recycled without a prior removal of $H_2S$ and/or light hydrocarbons.

That the process according to the invention is to be preferred to the other conceivable process consisting in that in the known process in which two separators are used, the pressure of the low-pressure separator (usually approximately 1 kg./cm.$^2$ or somewhat higher) is increased to the pressure to be used in the separator 29 in the present process (for example 23 kg./cm.$^2$) and the gas from the second separator is recycled as recycle gas, is shown from a comparison of the results given for cases 1 and 2 in Tables 2A and 2B. In fact, surprisingly enough the last column shows that with the use of the three separators operated as described before the distillation plant substantially less gas need be discharged as fuel gas via an $H_2S$ removal unit. It is true that the hydrogen losses are substantially the same, but the losses of valuable hydrocarbons ($C_1$–$C_4$, $C_5$–350° C.) are substantially smaller, viz. approximately 118 instead of approximately 139 kg. mol/hr., which means a reduction of more than 15%.

combination of steps of separating from petroleum by a topping distillation a broad range fraction including substantially all of the normally liquid hydrocarbons present boiling up to about 300 to 400° C. and containing pentanes, gasoline, naphtha, kerosene and other oils boiling up to said temperature range, contacting said broad range fraction in a hydrodesulfurization zone with a hydrogen containing gas obtained as hereafter specified and with a hydrodesulfurization catalyst under a pressure between about 30 and 65 kg./cm.$^2$ whereby part of the hydrogen is consumed, cooling the contacted mixture down to a temperature of at least about 40° C. under substantially the hydrodesulfurization pressure and passing the cooled material to a first phase separator, withdrawing gas rich in hydrogen from said first phase separator and recycling the same to the hydrodesulfurization zone, expanding the liquid phase from said first phase separator into a second phase separator maintained at a lower superatmospheric pressure between about 15 and 30 kg./cm.$^2$ and as further specified below, withdrawing gas from said second phase separator, adding to said last-mentioned gas reformer hydrogen as further specified below and compressing the mixture and passing the same to said hydrodesulfurization zone, withdrawing liquid from said second phase separator and expanding the same into a third

TABLE 2A

| | Feedstock (crude oil fraction boiling up to 350° C.) kg. mol/hr. | Make-up gas ex. reformer, kg. mol/hr. | Recycle gas ex. separator 24, kg. mol/hr. | Recycle gas ex. separator 29, kg. mol/hr. | Oil and gas ex. reactor, kg. mol/hr. | Liquid ex. separator, 24, kg. mol/hr. |
|---|---|---|---|---|---|---|
| Case 1: | | | | | | |
| $H_2$ | | 194.8 | 1,162.8 | 54.2 | 1,239.1 | 76.3 |
| $C_1$–$C_4$ | 221.8 | 91.2 | 303.9 | 33.9 | 650.8 | 346.9 |
| $H_2S$ | | | 21.8 | 3.3 | 68.2 | 46.4 |
| $C_5$–350° C. | 1,395.7 | | 4.9 | 0.7 | 1,401.4 | 1,396.5 |
| Total | 1,617.5 | 286.0 | 1,493.4 | 92.1 | 3,359.5 | 1,866.1 |
| Case 2: | | | | | | |
| $H_2$ | | 194.8 | 1,162.8 | 54.2 | 1,239.1 | 76.3 |
| $C_1$–$C_4$ | 221.8 | 91.2 | 303.9 | 33.9 | 650.8 | 346.9 |
| $H_2S$ | | | 21.8 | 3.3 | 68.2 | 46.4 |
| $C_5$–350° C. | 1,395.7 | | 4.9 | 0.7 | 1,401.4 | 1,396.5 |
| Total | 1,617.5 | 286 0 | 1,493.4 | 92.1 | 3,359.5 | 1,866.1 |
| Case 3: | | | | | | |
| $H_2$ | | 251.5 | 1,206.7 | | 1,285.5 | 78.8 |
| $C_1$–$C_4$ | 221.8 | 117.9 | 260.8 | | 600.5 | 339.7 |
| $H_2S$ | | | 20.3 | | 63.4 | 43.1 |
| $C_5$–350° C. | 1,395.7 | | 4.9 | | 1,400.6 | 1,395.7 |
| Total | 1,617.5 | 369.4 | 1,492.7 | | 3,350.0 | 1,857.3 |

TABLE 2B

| | Liquid ex. separator 29, kg. mol/hr. | Liquid ex. separator 35, kg. mol/hr. | Gas ex. separator 35, kg. mol/hr. | Gas ex. separator 56, kg. mol/hr. | Total gas to $H_2S$ removal unit; kg. mol/hr. |
|---|---|---|---|---|---|
| Case 1: | | | | | |
| $H_2$ | 22.1 | 1.5 | 20.6 | 1.2 | 21.8 |
| $C_1$–$C_4$ | 31.30 | 244.6 | 68.4 | 43.1 | 111.5 |
| $H_2S$ | 43.1 | 30.2 | 12.9 | 13.5 | 26.4 |
| $C_5$–350° C. | 1,395.8 | 1,392.3 | 3.5 | 3.4 | 6.9 |
| Total | 1,774.0 | 1,668.6 | 105.4 | 61.2 | 166.6 |
| Case 2: | | | | | |
| $H_2$ | 22.1 | | | 22.1 | 22.1 |
| $C_1$–$C_4$ | 313.0 | | | 128.1 | 128.1 |
| $H_2S$ | 43.1 | | | 29.7 | 29.7 |
| $C_5$–350° C. | 1,395.8 | | | 11.1 | 11.1 |
| Total | 1,774.0 | | | 191.0 | 191.0 |
| Case 3: | | | | | |
| $H_2$ | | | | | |
| $C_1$–$C_4$ | | | | | |
| $H_2S$ | | | | | |
| $C_5$–350° C. | | | | | |

We claim as our invention:
1. Petroleum refining process which comprises the phase separator at a lower superatmospheric pressure between about 3 and 7 kg./cm.$^2$, withdrawing gas from said third phase separator, separating withdrawn liquid from said third phase separator and passing the same to a first fractionation zone operated under conditions to separate a gas and light hydrocarbon overhead product and a heavy liquid bottom product, fractionating from said overhead product a naphtha fraction, catalytically reforming said naphtha fraction under dehydrogenation conditions in the presence of recycled hydrogen at a pressure between about 15 and 30 kg./cm.$^2$ thereby to produce a reformed product and a gas rich in hydrogen, separating said last-mentioned gas from the reformed product and passing the same to the stream of gas being removed from said second phase separator prior to the compression of said gas as aforesaid, and the pressures in said second phase separator and in the catalytic reforming effluent being substantially equal.

2. Process according to claim 1 further characterized in that said first fractionation zone is operated under a pressure of about 1 to 1.5 kg./cm.$^2$ and the gaseous part of the overhead product is compressed to a pressure equal to that in said third phase separator.

3. Process according to claim 1 further characterized in that the temperatures in the three phase separators are substantially equal and not substantially above 40° C.

4. Process according to claim 1 in which the pressure in said second phase separator is between 20 and 25 kg./cm.$^2$.

5. Process according to claim 1 in which said broad range fraction contains appreciable amounts of normally gaseous components.

6. Process according to claim 1 further characterized in that the first distillation is effected at a pressure of approximately 1 to 1.5 kg./cm.$^2$, the top products from the first distillation zone are first cooled at the distillation pressure to a temperature around 40° C., the noncondensing gases are compressed to a pressure which is substantially equal to that in the last phase separation zone before the first distillation zone and are then mixed with the components which have been condensed, the mixture is again cooled to temperature of approximately 40° C. and subsequently passed through a further phase separator, and the uncondensed gases are mixed with the gases from the third phase separation zone.

References Cited in the file of this patent

UNITED STATES PATENTS

| | | |
|---|---|---|
| 2,574,445 | Porter et al. | Nov. 6, 1951 |
| 2,614,066 | Cornell | Oct. 14, 1952 |
| 2,760,905 | MacLaren | Aug. 28, 1956 |
| 2,773,007 | Gerhold | Dec. 4, 1956 |

FOREIGN PATENTS

| | | |
|---|---|---|
| 602,097 | Great Britain | May 20, 1948 |